United States Patent [19]

Ogle

[11] 3,999,451
[45] Dec. 28, 1976

[54] AMP-GUARD

[75] Inventor: Robert W. Ogle, Newport Beach, Calif.

[73] Assignee: IMS Limited, S. El Monte, Calif.

[22] Filed: Aug. 21, 1975

[21] Appl. No.: 606,730

[52] U.S. Cl. ............................................. 81/3 R
[51] Int. Cl.² ........................ B25B 27/00; B26F 3/04
[58] Field of Search ................ 81/3 R, 3.43, 3.34, 81/64, 125, 121 R; 30/1.5; 294/20

[56] References Cited

UNITED STATES PATENTS

| 1,852,159 | 4/1932 | Hanks | 81/3 R |
|---|---|---|---|
| 2,117,017 | 5/1938 | Chadsey | 294/20 |
| 2,659,253 | 11/1953 | Myrick | 81/3 R |
| 2,701,491 | 2/1955 | Ross | 81/125 |
| 2,723,694 | 11/1955 | Ross | 81/64 |
| 2,924,481 | 2/1960 | Wagstaff | 294/20 |

FOREIGN PATENTS OR APPLICATIONS

| 1,032,311 | 3/1953 | France | 30/1.5 |

Primary Examiner—Al Lawrence Smith
Assistant Examiner—Roscoe V. Parker
Attorney, Agent, or Firm—Wills, Green & Mueth

[57] ABSTRACT

A novel protective hand tool for the manual or digital breaking of glass-sealed ampules of medication and other liquid or dry materials comprising two oppositely facing cylindrical members having a common longitudinal axis, each open at its outer end, each having a closed end, said closed ends being joined and separated by an intervening web of material, the walls of each said cylinder being composed of and having a thickness such that said walls are inwardly eliptically digitally deformable and recoverable to its original cylindrical form upon release of digital pressure, said cylinders being of differing diameters, each of said cylinders having a length adapted to receive the upper portion only of an ampule to be broken whereby the lower portion of said ampule projects beyond the end of said cylinder, each of said cylinders being of a diameter adapted to loosely receive said upper portion of said ampule whereby said walls can be externally eliptically digitally deformed against said upper portion of said ampule to hold said upper portion while said lower portion of said ampule is digitally held by the other hand so that said upper and lower portions can be broken and separated by flexing digital force.

7 Claims, 6 Drawing Figures

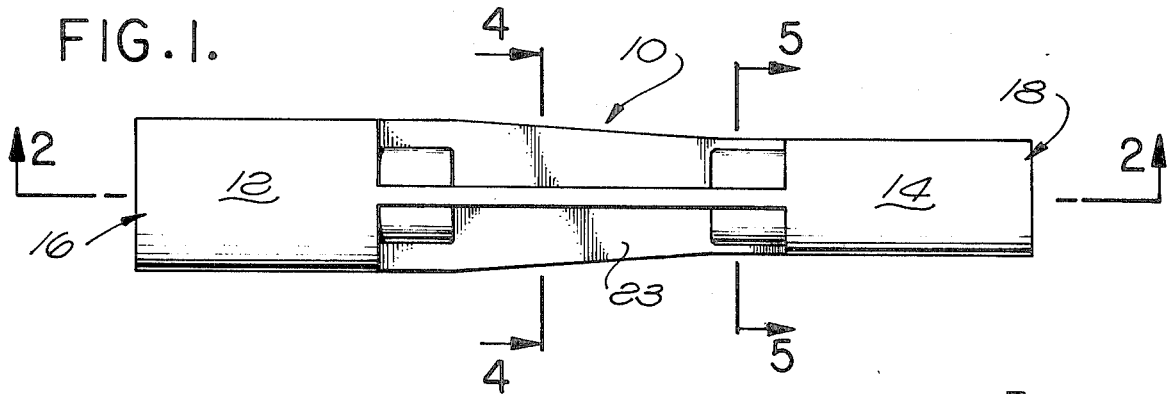
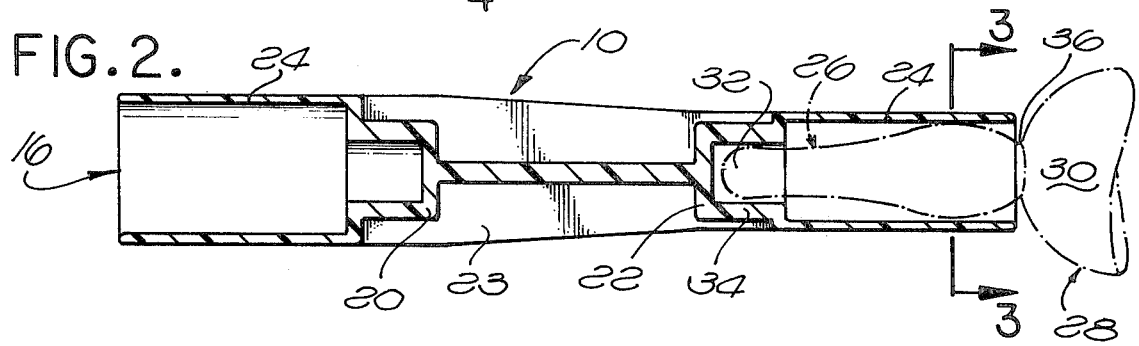
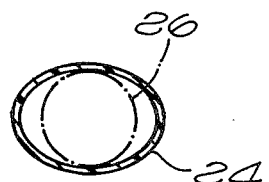
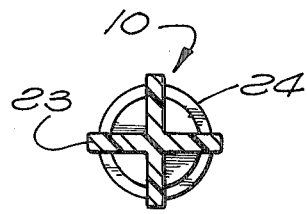
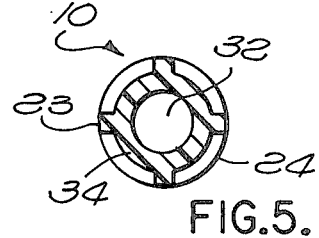
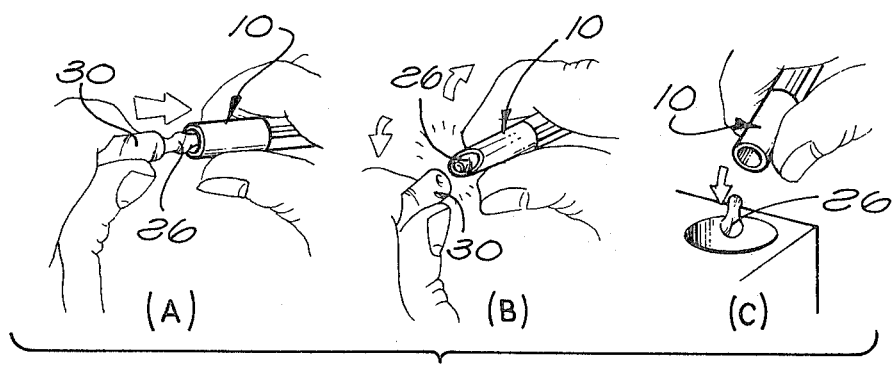

AMP-GUARD

BACKGROUND OF THE INVENTION

Liquid and powdered medication are commonly packaged in a glass ampule at the factory. The glass completely encapsulates the medication and is ideal in that glass is substantially inert, non-reactive, and non-absorptive. The seal effectively preserves the medication in a sterile or asceptic condition. At the time of use, the ampule, which has a necked-down area, viz, an area of reduced cross section in proximity to its upper end located above the fill level of the medication, is manually broken by the digital application of flexing force which separates the upper and lower portions of the ampule along a jagged, glassy edge at the necked-down area. The physician or nurse subsequently withdraw the medicinal contents of the ampule, such as with a hypodermic syringe.

The problem in the art has been that the breaking of the glass ampules to permit the wihdrawal of the medicinal contents has exposed medical personnel to the risk of cut fingers on the jagged glassy edge. More seriously, due to impefections in the glass, or abuse in transit and handling, the ampule not infrequently contains a hair line crack which parts when the digital flexing pressure is applied to open the ampule, with the consequence that the ampule comes apart in the hands and inflicts serious lacerations and cuts to the fingers and hands.

The present invention solves this serious and long-standing problem is a surprisingly simple way. It is to be expected that the novel protective hand tool of this invention will be widely and rapidly adopted by medical personnel.

SUMMARY OF THE INVENTION

Briefly, the present invention comprises a novel protective hand tool for the manual or digital breaking of glass-sealed ampules of medication and other liquid or dry materials comprising two oppositely facing cylindrical members having a common longitudinal axis, each open at its outer end, each having a closed end, said closed ends being joined and separated by an intervening web of material, the walls of each said cylinder being composed of and having a thickness such that said walls are inwardly eliptically digitally deformable and recoverable to its original cylindrical form upon release of digital pressure, said cylinders being of differing diameters, each of said cylinders having a length adapted to receive the upper portion only of an ampule to be broken whereby the lower portion of sid ampule projects beyond the end of said cylinder, each of said cylinders being of a diameter adapted to loosely receive said upper portion of said ampule whereby said walls can be externally eliptically digitally deformed against said upper portion of said ampule to hold said upper portion while said lower portion of said ampule is digitally held by the other hand so that said upper and lower portions can be broken and separated by flexing digital force.

It is an object of my invention to provide a novel protective hand tool.

More specifically, it is an object of this invention to provide a novel device for the protection of personnel in the manual or digital opening of glass-sealed vials commonly used for liquid and dry medication.

Another object of this invention is the effective solution of the long-standing problem in the medical arts occasioned by the opening of glass vials by the application of flexing pressure wherein the ampules oftimes part in the hands with the inflections of serious jagged glass-produced cuts and wounds due to the presence of the ampule of undetected, fine or hair-line cracks.

These and other objects and advantages of this invention will be apparent to those skilled in the art from the accompanying drawings and the detailed description which follows.

DESCRIPTION OF PREFERRED EMBODIMENTS

Turning to the drawings:

FIG. 1 is a plan view of the novel protective hand tool of this invention.

FIG. 2 is a sectional view taken along the line 2—2 in FIG. 1.

FIG. 3 is a sectional view taken along the line 3—3 in FIG. 2.

FIG. 4 is a sectional view taken along the line 4—4 in FIG. 1.

FIG. 5 is a sectional view taken along the line 5—5 in FIG. 1.

FIG. 6 is a perspective series of views illustrating the use or operation of the novel hand tool of my invention in the opening of a typical glass ampule of medication.

Considering now the drawings in greater detail, the novel protective hand tool, generally identified as 10, has two oppositely facing cylindrical members 12 and 14 having a common longitudinal axis. Each cylinder is open at its outer end, 16 and 18. Each cylinder has a closed end 20 and 22. The closed ends are joined and separated by an intervening web of material 23. The walls of each cylinder 12 and 14 is composed of and has a thickness such that the walls 24 in proximity to the open ends are inwardly eliptically digitally deformable and recoverable to its original cylindrical form upon release of digital pressure. The cylinders 12 and 14 are of differing diameters. Each of the cylinders have a length adapted to receive the upper portion 26 only of an ampule 28 to be broken whereby the lower portion 30 of the ampule 28 projects beyond the end of the cylinder. Each of the cylinders 12 and 14 has a diameter adapted to loosely receive the upper portion 26 of the ampule 28 whereby the walls 24 can be externally eliptically digitally deformed against the upper portion 26 of the ampule 28 to hold the upper portion 26 while the lower portion 30 of the ampule 28 is digitally held by the other hand so that the upper and lower portions 26 and 30 can be broken and separated by flexing digital force.

The walls 24 are normally composed of high density polyethylene or polypropylene. The thickness of these walls is such that they are digitally deformable and can be readily determined for any given plastic or other construction material.

As can be seen, cylinders 12 and 14 differ in diameter. The larger diameter cylinder 12 is adapted to receive the upper end of a standard 2cc glass medicinal ampule. The smaller diameter cylinder 14 is adapted to receive the upper end of a standard 1cc glass medicinal ampule. The depth or length of the cylinder 12 is essentially equal to the length of the upper portion of a 2cc ampule (not illustrated). The upper portion constitutes the portion above the normal "breakline" or necked-down portion of the ampule which is intended to be broken for withdrawal of the medicinal contents.

Similarly, the depth of cylinder 14 is essentially equal to the length of the upper portion 26 of the 1cc ampule 38. The term upper portion here has the same meaning as stated in the previous paragraph.

As can be best seen in FIG. 2, the cylinder 14 receives the upper portion 26 of 1cc ampule 28 with some lateral play and hence is said to be loosely received. The terminal bulb portion 32 of the upper portion 26 is received in a smaller cylindrical portion 34 which is considered to be a part of cylinder 14 and has a common center line therewith. The purpose of portion 34 is to restrict lateral sliding or excessive sideways movement of the terminal portion 32 of the ampule when the flexing pressure is applied to break the ampule 28 at the breakline 36. The walls of cylinder 14 in the area of portion 34 need not be digitally deformable since no such deformation is required at that point. The walls here can be deformable, at the option of the plastic molder, but preferably they are not deformable.

In operation, the upper portion 26 of the ampule is bottomed out in cylinder 14, which aligns the breakline 36 with the open end 18. The left hand fingers grasp the exposed lower end 30 of the ampule 28 while the right hand fingers grasp the external surface of cylinder 14 containing the upper end 26 of the ampule and squeezes the walls 24 against the upper end 26. By a flexing action or force between the hands, the ampule 28 is broken open along line 36.

As will be apparent, the other end of the tool 10 can be used to break open a 2cc ampule.

A primary virtue of the invention is that the tool protects the fingers from the consequences of broken glass in the event the ampule comes apart due to hairline cracks. These cracks normally occur only at the upper or thinner portions of the ampule.

It will also be understood that the free or unused length of the tool 10 in any opening operation affords leverage which better enables medical personnel to apply the necessary flexing force to the relatively short or stubby upper portion of the ampule.

Having fully described the invention, it is intended that it be limited solely by the lawful scope of the appended claims.

I claim:

1. A novel protective hand tool for the manual or digital breaking of glass-sealed ampules of medication and other liquid or dry materials comprising two oppositely facing cylindrical members having a common longitudinal axis, each open at its outer end, each having a closed end, said closed ends being joined and separated by an intervening web of material, the walls of each said cylinder being composed of and having a thicknes such that said walls are inwardly eliptically digitally deformable and recoverable to its original cylindrical form upon release of digital pressure, said cylinders being of differing diameters, each of said cylinders having a length adapted to receive the upper portion only of an ampule to be broken whereby the lower portion of said ampule projects beyond the end of said cylinder, each of said cylinders being of a diameter adapted to loosely receive said upper portion of said ampule whereby said walls can be externally eliptically digitally deformed against said upper portion of said ampule to hold said upper portion while said lower portion of said ampule is digitally held by the other hand so that said upper and lower portions can be broken and separated by flexing digital force.

2. The novel tool of claim 1 wherein the said walls are high density polyethylene or polypropylene.

3. The novel tool of claim 1 wherein one of said cylinders has a length and diameter adapted to receive only the upper portion of a standard 1cc medicinal ampule whereby the breakline is essentially aligned with said open outer end.

4. The novel tool of claim 3 wherein the other end of said cylinder has a length and diameter adapted to receive only the upper portion of a standard 2cc medicinal ampule whereby the breakline is essentially aligned with said open outer end.

5. The novel tool of claim 1 wherein the said intervening web is of a length sufficient to permit significant leverage in the breaking open of standard medicinal ampule along the breakline.

6. The novel tool of claim 1 wherein each said cylinder in proximity to its closed end has a portion of reduced internal diameter adapted to restrict lateral movement of the terminal bulb portion of a standard medicinal ampule.

7. The novel tool of claim 6 wherein said walls in the portion of reduced internal diameter are not digitally deformable.

* * * * *